INVENTOR
Salvatore A. Guerrieri

BY  Flynn, Marn & Jangarathis
ATTORNEYS

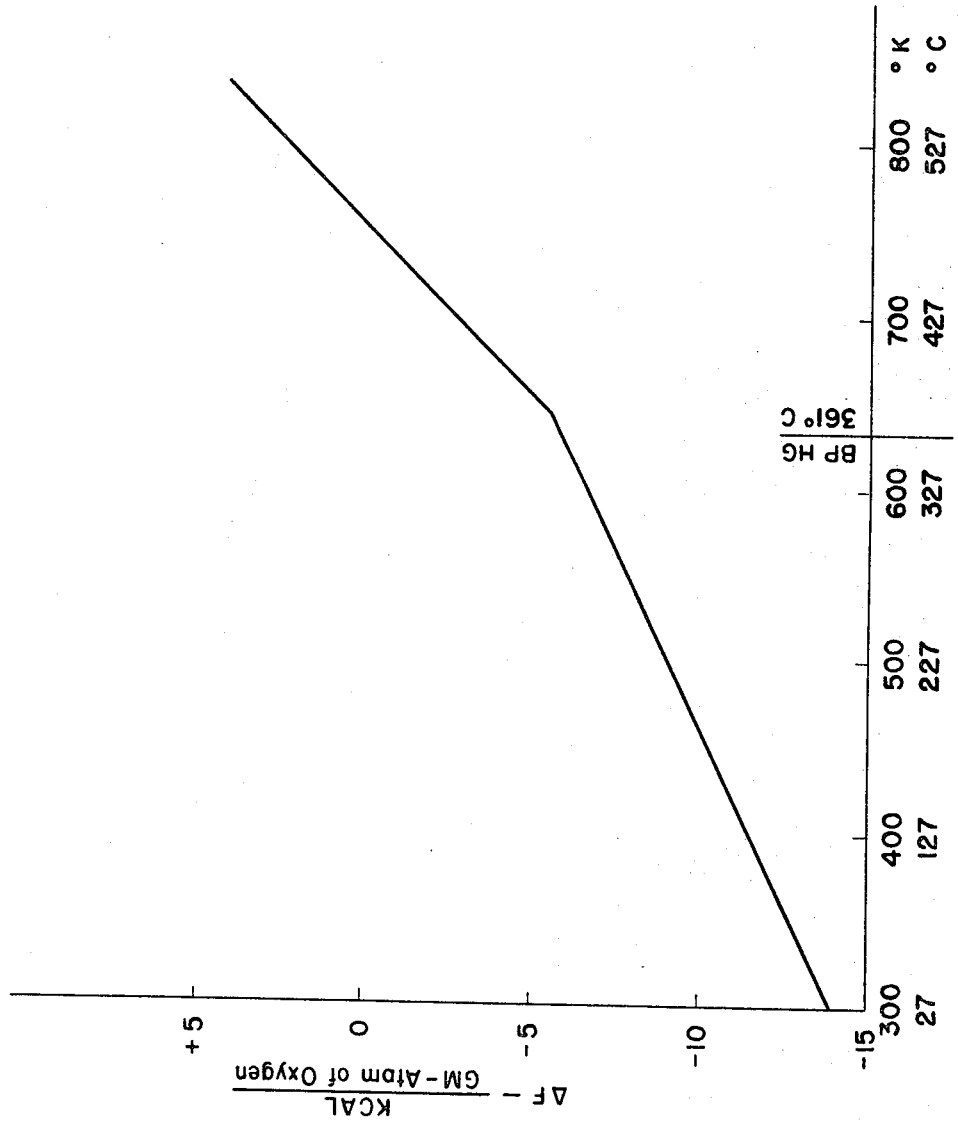

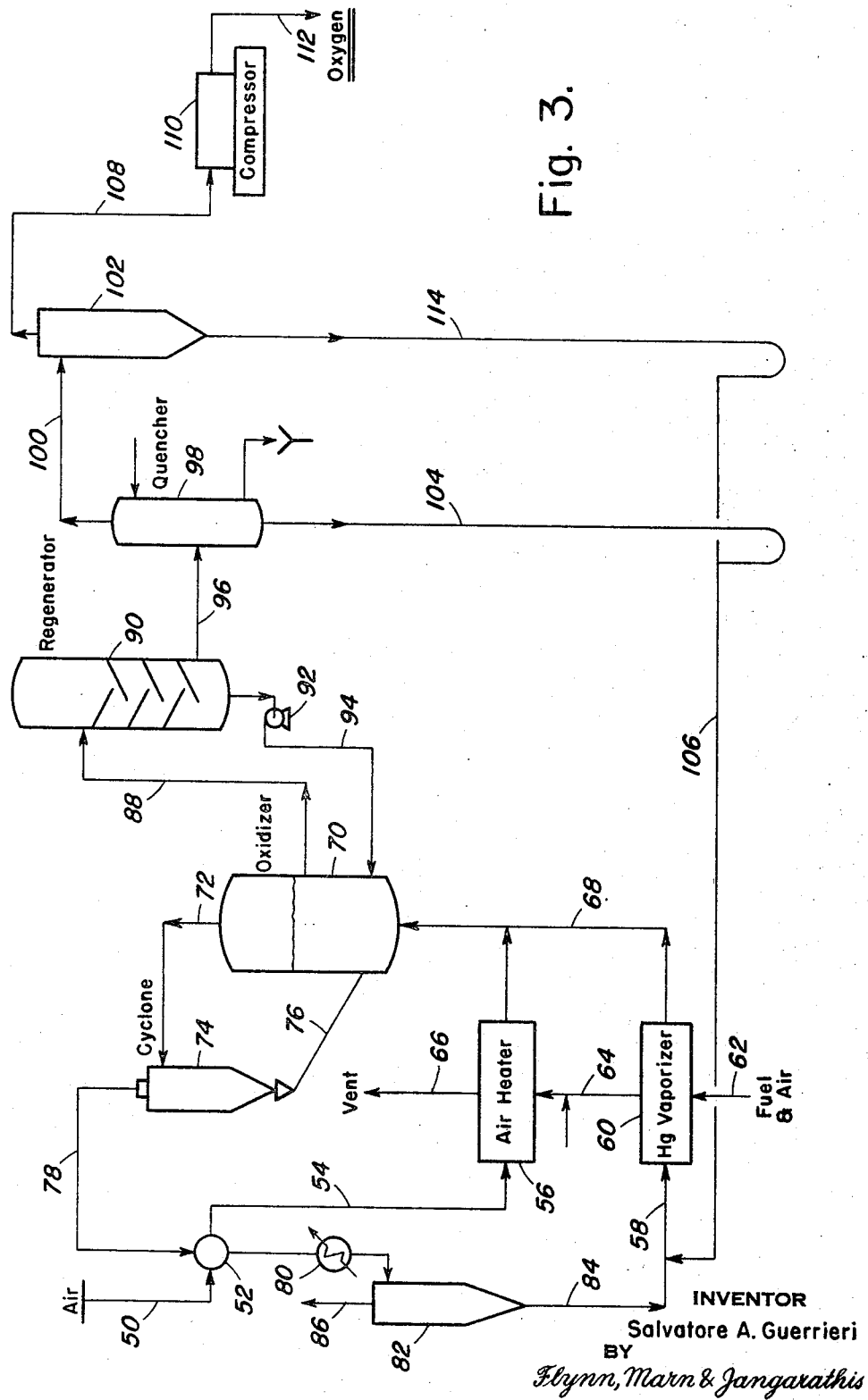

3,406,014
CHEMICAL PROCESS FOR THE PRODUCTION OF
OXYGEN AND NITROGEN FROM AIR
Salvatore A. Guerrieri, Rowayton, Conn., assignor to
The Lummus Company, New York, N.Y., a corporation of Delaware
Filed Mar. 22, 1965, Ser. No. 441,712
7 Claims. (Cl. 23—221)

ABSTRACT OF THE DISCLOSURE

A process for producing oxygen from air wherein air is reacted with mercury vapor at a temperature between 400° and 500° C. and a pressure of at least atmospheric pressure to form mercury oxide and heating the mercury oxide to a temperature greater than 400° C., the temperature being greater than 500° C. when the pressure is atmospheric pressure or greater, to decompose the mercury oxide into oxygen and mercury vapor. The mercury vapor and oxygen are rapidly cooled to prevent further reaction and the oxygen recovered. The process may also be employed for producing nitrogen by contacting the air with an excess of mercury vapor, thereby removing all of the oxygen and producing a stream of essentially nitrogen. An inert liquid heat transfer medium may be circulated back and forth between the mercury oxide forming and decomposition reactions, in direct contact with the reactants, in order to balance the heat requirements thereof.

---

Figure 1:
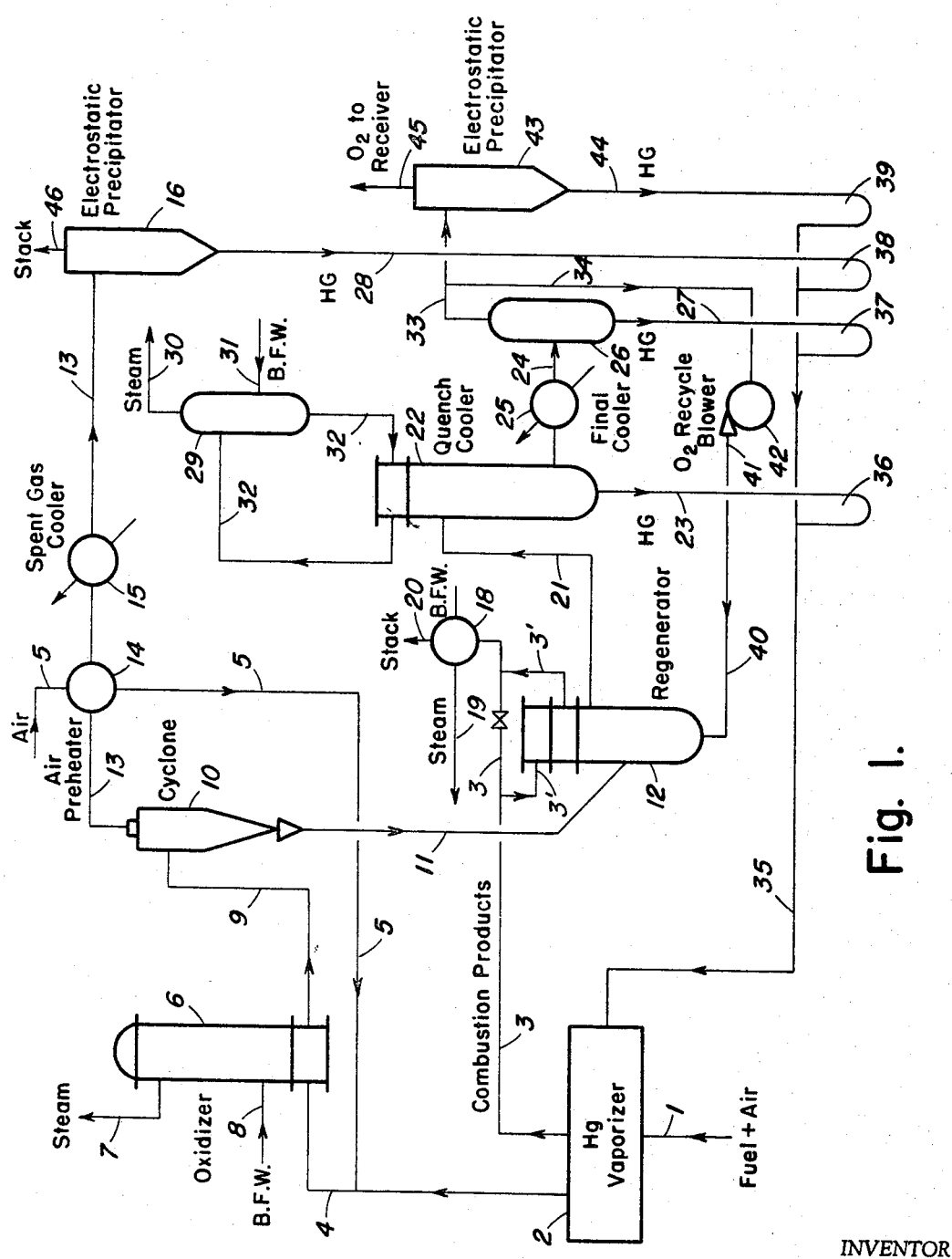

This invention relates to the production of gases, and more particularly, it relates to the production of oxygen, nitrogen or both from air. In particular, the invention is concerned with a simple and practical cyclic chemical process for the production of oxygen and nitrogen from air.

While the production of oxygen and nitrogen have been of importance for many years, the tremendous strides and growth of the chemical industry in recent years has created a demand for a simple and practical method of producing substantially pure oxygen and nitrogen. The chemical processes heretofore known to the art for the production of these gases have failed to satisfy this ever growing demand, for not only has the cost of production been prohibitively high, but the purity of the elemental products has been too low for certain uses.

Heretofore, oxygen has been almost universally produced by physical separation processes involving air compression, cooling and distillation. Although the use of modern engineering techniques have consistently improved such processes and lowered costs, these known methods are complex and still quite expensive, and further substantial improvement in economy by such methods is dubious. Other methods of producing oxygen, for example, extraction from air by the use of selective adsorbents, have been proposed, but such processes have not been completely successful because of the lack of a commercial absorbent.

Various chemical means have also been proposed for separating oxygen from air. One well known process of this type is the so-called Brin process which employs a BaO-BaO₂ cycle to produce oxygen. This process has proven economically impractical and most importantly, could not produce pure oxygen in commercial quantities. Therefore, at present, no simple, practical and economic chemical means for the production of oxygen is known which can successfully compete with the complex, and relatively expensive, physical air separation processes. The process of the instant invention overcomes these disadvantages and provides a simple and practical process for producing these gases.

Nitrogen, a product which can also be produced by the instant process, is well known as a valuable source of ammonia by combination with appropriate quantities of hydrogen. This element also finds utility in situations where inert atmospheres are desired.

Heretofore, nitrogen has been obtained primarily from such sources as the fractional distillation of liquid air and by chemical processes, such as the reaction of ammonia with bromine water. The fractional distillation of liquid air is the only one found commercially attractive.

It is therefore a general object of the present invention to provide an improved chemical process for production of oxygen and nitrogen which overcomes the disadvantages of prior art processes.

A further object of the invention is to provide an improved chemical process for producing oxygen and nitrogen of commercial purity which is competitive, in terms of both capital and operating costs, with physical separation processes now in use.

Other objects and advantages of the invention will become clear in the course of the following description of several embodiments thereof, and the novel features will be particularly pointed out in connection with the appended claims.

In accordance with the present invention, it has been found that if mercury is vaporized, mixed with preheated air, passed into a reactor where mercury oxide is formed, and the oxide is then decomposed into elemental mercury and oxygen, oxygen may then be recovered therefrom. The oxygen recoverable from this process is of high purity and the operating costs compare favorably with physical separation processes. Nitrogen may also be recovered by separating the gas from which the oxygen has been removed. The process of this invention is adapted to be carried out in a continuous manner.

While not wishing to be bound to any particular theory of operation, the apparent chemical reaction which is involved in forming the oxide and subsequently decomposing it to obtain the free oxygen is the reversible reaction:

(I)    $2Hg + O_2 \rightleftharpoons 2HgO \Delta H_{25° C.} = -43.2$ kcal.

The presence of mercury and air in the vapor phase may of course cause the formation of other oxides of mercury, for example $Hg_2O$, which also decompose and it is intended to cover all such oxides of mercury.

The process of the invention, where oxygen is the desired product, is carried out generally as follows. Free mercury is initially vaporized in a fired heater at a moderately high temperature and pressure. The mercury vapor formed thereby is then mixed with preheated air and this mixture is passed into a reactor wherein the mercury oxide is formed. The conditions existing in the reactor are such as to favor reaction I going to the right.

The oxide leaves the oxidizer and is carried pneumatically to a cyclone by spent air wherein the two phases are separated. The separated mercury oxide is removed from the cyclone and decomposed to elemental mercury and oxygen. The oxygen is then recovered and the mercury recycled to the vaporizer.

The above process as outlined is predicated on the ground that oxygen is the sole desired product. When nitrogen is also to be produced, the process may be operated alternatively in two possible ways. One is that an excess of mercury is maintained in the oxidizer to assure complete consumption of the oxygen. In this case, the excess mercury is knocked down in an air preheater and spent gas cooler and returned to the vaporizer. Alternatively, where it is desired to prepare synthesis gas for ammonia synthesis by the partial oxidation of a hydrocarbon, the oxidizer is operated with an amount of excess air such that spent gas has nitrogen and oxygen in just the right proportions to give the required nitrogento-hydrogen ratio after the spent gas has been used in the partial oxidation, shift conversion, clean up, etc. in the subsequent ammonia synthesis. In this case, oxygen is obtained as a by-product. It is to be noted, however, where oxygen is the only desired product, the spent gas recovered contains nitrogen in a predominant amount.

An embodiment of the invention is carried out as follows.

The free mercury is vaporized in a fired heater at elevated temperatures and pressures. The mercury vapors generated in this vaporizer are passed to the oxidizer with the preheated air.

Conditions within the oxidizer are determined by the free energy curve of the reaction and reaction rates, as discussed more fully hereinafter. Generally, about 400° C. is preferred; the reaction rate drops at lower temperatures although a more negative free energy favors oxide formation. The upper limit is about 500° C., where the free energy change approaches zero. The use of high pressures and excess air favors oxide formation, as would be expected from equilibrium considerations.

It is to be noted that by suitably arranging the equipment, movement of liquid mercury can be accomplished by gravity flow and pumps therefore are thus unnecessary.

After the oxide is formed in the oxidizer, it is carried into a cyclone by the spent air. In the cyclone the phases are separated into spent air and mercury oxide. The spent air passes first through the preheater to preheat the air for the oxidation process. It then passes through a cooler to drop out any unreacted mercury by condensing the mercury vapor, and the spent air is finally passed through an electrostatic precipitator to recover any traces of mercury still remaining therein.

The mercury oxide separated in the cyclone is dropped into a regenerator where the oxide is decomposed to elemental mercury and oxygen. The preferable conditions existing in the regenerator are those which favor the reverse reaction (right to left) in Equation I (i.e. 500° C. and higher).

As the decomposed reaction products are highly reactive, it is necessary to cool them quickly through the temperature region in which they are reactive. For this purpose, a quench cooler is utilized in which low pressure (i.e. 15 p.s.i.g.) steam is generated.

The mercury settling in the bottom of the quench cooler is returned to the vaporizer to be reused in the oxidation process. The oxygen and any uncondensed mercury vapor are then permitted to flow through a final cooler to condense any remaining mercury vapor. Finally, the oxygen stream is passed through an electrostatic precipitator to eliminate any mercury still remaining, and from there the oxygen goes to a gas holder or to another process as desired. The mercury collected in the final cooler and the electrostatic precipitator is returned to the vaporizer for reuse.

When nitrogen is the desired product, the process is varied as pointed out hereinabove. For instance, a quantity of nitrogen may be produced by the process of this invention by maintaining an excess of mercury in the oxidizer to assure complete consumption of all the oxygen contained in the air, thereby leaving air containing predominantly only nitrogen.

In a second embodiment of the invention, the principles are the same but the method of carrying out the process is different. In this case a heat carrier such as "Hitec," (trademark) a high temperature heat transfer salt mixture, or sodium hydroxide or other similar material "inert" to the reactants is employed in the molten state to absorb the heat of reaction in the oridizer and then to supply the heat of reaction, as well as the reactants, to the regenerator. This smelt acts as a flywheel between the oxidizer and the regenerator whereby the heat of oxidation in the oxidizer is transferred to the regenerator to supply the heat of decomposition. Since the two heat quantities are substantially equal, the oxidizer and regenerator heat requirements are in balance except for heat losses to the surroundings. Such losses can readily be taken care of by superheating the air or the mercury vapor prior to introduction into the oxidizer.

In this process air and vaporized mercury are fed into the bottom of the oxidizer. The mixture rises through the pool of molten heat carrier which maintains substantially uniform temperature conditions through the oxidizer and rapid heat transfer between the gaseous reactants and bed. Since the heat must be transferred from the oxidizer to the regenerator and since the temperature level in the oxidizer is higher than in the regenerator, it is necessary to operate the oxidizer at a higher pressure than the regenerator in order for the reactions to proceed in the proper sequence. The exact pressure at which these two vessels operate is essentially fixed by equilibrium and other thermodynamic conditions as well as economic considerations. It is obvious that enough smelt must be recirculated between the oxidizer and regenerator operating between these two temperature limits so that hourly heat capacity of the recirculated smelt plus the heat supplied in the preheater is exactly equal to the hourly heat of reaction.

In this embodiment, an oxygen compressor is required to deliver the oxygen produced to a gas holder or other user, whereas in the previously described embodiment the system pressure is high enough to deliver the oxygen to a holder.

Reference is now made to the drawings accompanying this application, and wherein:

FIGURE 1 shows a schematic flow diagram showing apparatus suitable for carrying out a first embodiment of the process of the invention;

FIGURE 2 sets out a graph which shows the free energy of formation of mercury oxide as a function of temperature; and FIGURE 3 is a schematic flow diagram of a second embodiment of the invention.

With reference to FIGURE 2, it can be seen that the free energy of formation, $\Delta F$, is zero at about 750° K. (477° C.), so the formation of HgO will be favored at temperatures below this, and decomposition will be favored at high temperatures. Of course, FIGURE 2 illustrates the relationship at atmospheric pressure; with a high partial pressure of oxygen, there is a shift in the curve and somewhat higher temperatures may be employed with good results. As noted above, 500° C. is considered a practical upper limit. As also noted above, it is possible to operate the oxidizer at a higher temperature than the decomposer if suitable pressures are employed at each stage.

The apparatus set forth in FIGURE 1 comprises essentially a mercury vaporizer 2, an oxidizer 6, a cyclone 10, an air preheater 14, a regenerator 12, a quench cooler 22 and electrostatic precipitators 16 and 43. The operation of this equipment, together with specific descriptions thereof, will be described with respect to the production of oxygen from air, it being understood that nitrogen may also be produced by the process of this invention as pointed out above.

In the initial step, fuel and air, the heating means, are passed through line 1 into the mercury vaporizer 2 to maintain the temperature of the vaporizer at about 400° C. at 1,570 mm. Hg absolute. The combustion products resulting from the heating process are passed in lines 3 and 3' to heat the regenerator unit 12. Any excess combustion products may be passed directly to recuperator 18 and into the atmosphere.

The vaporizer used to vaporize the mercury may be of any desired type. One such type of vaporizer would be a unit wherein horizontal vaporizer tubes half full of mercury are heated by burners contained on the floor or walls of the heater. Any operable vaporizer is deemed to be within the scope of this invention.

The mercury vapor resulting from the vaporizing process is passed in line 4 to oxidizer 6. Simultaneously, air is added to the mercury vapor through line 5, becoming mixed with the mercury vapor in line 4. In order to insure substantially complete oxidation of the mercury, air in excess of the theoretical amount should be introduced. Prior to mixing with the mercury vapor, the air is preheated by passage through preheater 14, where waste heat in the spent air is recovered. This hot mixture in line 4 is then introduced into oxidizer 6 where the mercury oxide is formed at about 400° C. Pressure in the oxidizer is about the same as the vaporizer.

The oxidizer 6 is essentially a heat exchange device which maintains the selected conditions at desired levels. While any such heat exchange unit is considered within the scope of this invention, I find that an exchange device on the order of a steam generator performs very satisfactorily. In this type of device, the heat exchange is controlled by boiling water. In this specific embodiment, the oxidizer 6 is maintained at about 400° C. by means of boiler feed water introduced through line 8, as in a steam generator, and the steam is removed therefrom through line 7.

After the mercury oxide is formed in oxidizer 6, it is carried pneumatically through line 9 into cyclone 10. In cyclone 10, the two phases (spent air containing primarily nitrogen and mercury oxide) are separated. The cyclone may be of conventional construction, but of course must be adapted for operation at process temperatures and pressures. Other types of gas-solid separating devices may of course be used.

The separated spent air is thereupon passed via line 13 first through the air preheater 14, and then through spent gas cooler 15 where any unreacted mercury is condensed and returned to the mercury vaporizer (return not shown). The spent air and condensed mercury flow through line 13 to an electrostatic precipitator 16 where the remaining traces of mercury are separated and recycled to vaporizer 2 via line 28. The spent air is then expelled from the reaction system through line 46.

The mercury oxide separated in cyclone 10 is withdrawn downwardly through line 11 so as to enter the regenerator 12. The regenerator 12, being heated by the hot combustion products from vaporizer 2 via line 3, is maintained at about 530° C. since at this temperature the free energy change is favorable for the reverse (decomposition) reaction noted in Equation I above.

The regenerator 12 may be of any construction, and the particular unit described herein is not deemed to limit the invention. One operative regenerator, however, consists of a heated, fluidized bed of mercuric oxide and a promotor, such as ferric oxide, maintained in a fluidized state partly by recirculated oxygen and partly by the gaseous products of the decomposition reaction. Other types of promotors, such as vanadium pentoxide, are similarly operative. In charging the regenerator 12, the mercuric oxide should be introduced near the top of the bed since it is considerably heavier than the promotor oxides and therefore will tend to drop through the bed and become uniformly dispersed. When the noted decomposition reaction occurs, the released oxygen and mercury vapor help to fluidize the bed. While this is a preferred apparatus for regenerating, other devices are within the scope of this invention.

The hot combustion products which enter the coil or tubes in the regenerator 12 via line 3', and which supply the heat therefor, are removed continuously during the heating process via line 3' and introduced into a heat exchanger 18 through line 3. The economically recoverable heat is then removed as steam from the heat exchanger 18 via line 19, boiler feed water being supplied thereto as shown, and the waste products of combustion are eliminated through line 20.

As the decomposition products (oxygen and mercury vapor) in the regenerator 12 are highly reactive, it is necessary that rapid cooling be effected. Therefore, the gases are released through line 21 to a quench cooler 22 wherein they are abruptly cooled and heat is recovered by generation of low pressure (15 p.s.i.g.) steam. The mercury vapor condenses and settles in the bottom of the quench cooler 22 wherefrom it is returned to the vaporizer 2 via line 23 for reuse.

The low temperature conditions in the quench cooler 22 are maintained by the recirculation of boiler feed water from steam separator 29 through the tubes in quench cooler 22 and back into separator 29, in which a boiling water level is maintained by means of line 31. The steam emanating from the separator 29 passes out through line 30. Alternatively, a direct contact cooler can be used (not shown) in which case the cooled mercury would be recirculated through the contactor, or cold water would be used as the coolant. The first method has the advantage of making heat recovery possible, whereas the direct contact method has the advantage of quicker quenching.

An alternative to the quench cooler described above is to separate the decomposition products while hot, as for example by diffusion, followed by separate condensation of the mercury vapor. This has the obvious advantage of avoiding any possible reaction between the decomposition products during cooling.

Oxygen and any uncondensed mercury vapor leave the quench cooler 22 and pass through line 24 to a final cooler 25 wherein any remaining mercury vapor is condensed and is then passed into a separator 26. Here the condensed mercury is withdrawn downwardly through line 27 to be recycled to the vaporizer 2 through line 35. The oxygen stream is removed from the separator 26 through line 33 to an electrostatic precipitator 43 to eliminate any remaining mercury and from there the oxygen is collected or utilized as desired through line 45. The mercury collected in electrostatic precipitator 43 is withdrawn downwardly through line 44 to be recycled to the vaporizer 2 through line 35.

The mercury withdrawn downwardly from quench cooler 22 through line 23, from separator 26 through line 27, from electrostatic precipitator 16 through line 28, and from electrostatic precipitator 43 through line 44, passes through seal legs 36, 37, 38 and 39, respectively, as it recycles back to vaporizer 2 through line 35 for reuse in the continuous process.

The electrostatic precipitators, 16 and 43, may be of any known design or construction, as many types of these devices are well known to the art.

In order to fluidize the solids in regenerator 12, a recycle blower 42 is utilized. Recycle blower 42 is operated so as to circulate a portion of the oxygen from line 33 into line 34 and to recycle the same through the regenerator 12 via line 40. This recycle oxygen, together with the products of regeneration, maintain the solids in regenerator 12 in a fluidized state.

In FIGURE 3 there is illustrated a second embodiment of the invention wherein an inert heat transfer medium is circulated between the oxidizer and the regenerator, absorbing heat in the former and supplying heat to the latter.

With reference to FIGURE 3, air in line 50 is initially preheated in exchanger 52 by spent gases passing out of the system, and is then passed in line 54 to air heater 56.

Recycled mercury in line 58 is passed to mercury vaporizer 60, where the combustion of fuel and air from line 62 is employed to vaporize the material, hot combustion gases being passed in line 64 to heat the air in heater 56. Cooled combustion products are vented from the system via line 66.

Mercury vapor and suitably heated air are combined in line 68 and passed into the bottom of oxidizer 70 which, as noted above, contains a suitable liquid heat transfer medium. A fluidized or bubbling state is maintained within oxidizer 70 by the passage of the aforementioned gases and vapor. Such agitation is beneficial to the process because it promotes good heat transfer between the phases and because it helps to keep the mercury oxide produced in the process uniformly dispersed in the heat transfer medium.

Spent air (mostly nitrogen) and entrained liquid or solid is passed in line 72 to cyclone 74, where the liquid and entrained solids are separated out and returned to the oxidizer via line 76. The air then passes in line 78 through preheater 52, final cooler 80, and precipitator 82, where any remaining mercury is removed and recycled in line 84. The spent gas is then vented in line 86 or treated for nitrogen recovery.

The mercury oxide formed in oxidizer 70 is carried, along with the heat transfer medium, in line 88 to regenerator 90. As noted hereinabove, the oxidizer operates at a higher pressure and temperature than the regenerator. A suitable set of conditions is to operate the oxidizer at 5 atm. pressure and 460° C., while operating the regenerator at 230 mm. Hg absolute and 400° C. Due to the pressure difference, pump 92 must be employed to return the heat transfer medium, in line 94, to oxidizer 70.

The gaseous decomposition products are treated in essentially the same manner as in FIGURE 1, leaving the regenerator in line 96 and passing into quencher 98, where oxygen and mercury are separated, the former passing in line 100 to precipitator 102, and the latter passing in lines 104 and 106 back to the vaporizer. As the regenerator operates at subatmospheric pressure, however, the pure oxygen leaving precipitator 102 in line 108 must be compressed at 110 before being sent to a holder in line 112. Additional mercury recovered in precipitator 102 is returned to the vaporizer via lines 114 and 106.

As noted above, the conditions in oxidizer 70 and regenerator 90 are closely interrelated. However, if independent control of these units is desired, this can be accomplished by placing a heater (not shown) in line 88 and a cooler (not shown) in line 94. In this instance the heat economy for the process may not be quite as good as the arrangement shown in FIGURE 3, but the regenerator 90 could be operated at atmospheric pressure or higher, whereby compressor 110 could be either eliminated or reduced in horsepower.

In a typical example of the operation of the process wherein the production of about 120 tons per day (312.5 mols/hr.) of oxygen is to be produced, a plant of the type illustrated in FIG. 1 may be operated substantially as follows:

| | |
|---|---|
| Air supply, lb. mols/hr. | 2220 |
| Mercury supply, lb. atoms/hr. | 625 |
| Conditions in 2 ° C. | ¹400 |
| Conditions in 6 ° C. | ¹400 |
| Temperature in 12 ° C. | ¹530 |

¹ At 1,570 mm. Hg absolute.

Where nitrogen is to be produced by altering the reactant proportions in the above process, as described hereinbefore, the air supply should be set at 395 lb. moles per hour and the mercury supply should be about 150 lb. atoms/hr. in order to produce 312.5 lb. mols of nitrogen per hour.

In describing this specific embodiment of my invention, certain common accessories such as pumps, valves, fittings, etc., readily recognized as necessary by those skilled in the art, have been omitted for the sake of brevity and clarity.

What is considered to be the heart of the process, and a basic novel feature, is the oxidation step which is carried out in the vapor phase. The difficulties previously encountered by the prior art in oxidizing mercury with air have herein been overcome by carrying out the oxidation process in the vapor phase as described in detail above. Another novel feature resides in the method described for regenerating the mercury oxide and removing the products.

It is evident that many variations and alternatives are available to one skilled in the art when conducting the above described process. For example, the mercury oxide may alternatively be decomposed by dispersal into the top of a vertical, heated column. Also, one is not required to use the combustion products emanating from the vaporizer to heat the regenerator as other means are equally operable and within the scope of this invention.

A further alternative would involve the method of transporting the mercury oxide from the cyclone 10 to the regenerator 12. For example, instead of utilizing pneumatic means with steam or oxygen, a mass lift method could also be used.

The hereinabove described process has been set forth in the specific embodiments with reference to specific reactant amounts and specific operating conditions. However, it is obvious that many modifications and variations of my invention may be made without departing from the spirit and scope thereof. Accordingly, only such limitations are to be imposed as are indicated in the appended claims.

What is claimed is:

1. A process for the production of oxygen from air which comprises:
   introducing mercury in the vapor phase and air into an oxidation zone containing an insert liquid heat transfer medium, said oxidation zone being maintained at a temperature between about 400° C. and 500° C. and a pressure of at least atmospheric pressure, whereby the mercury reacts with the oxygen of the air to produce mercury oxide;
   passing the inert liquid heat transfer medium and the mercury oxide to a decomposition zone, said decomposition zone being maintained at a temperature greater than 400° C., the temperature being greater than 500° C. when the pressure is a pressure of at least atmospheric pressure, the pressure of the decomposition zone being lower than the pressure of the oxidation zone, whereby the mecury oxide is decomposed into oxygen and mercury;
   recycling the inert liquid heat transfer medium to the oxidation zone whereby the circulation of the inert liquid heat transfer medium between the oxidation and decomposition zones maintains the required temperatures therein;
   cooling the oxygen and mercury formed in the decomposition zone to prevent further reaction and to condense the mercury; and
   recovering the oxygen therefrom.

2. The process as claimed in claim 1, and further comprising recovering said mercury for reuse.

3. The process as claimed in claim 1, and additionally comprising:
   supplying said mercury vapor in a stoichiometric excess of the amount required to react with the oxygen of said air; and
   recovering a gaseous product from said oxidation zone, said gaseous product being substantially nitrogen.

4. The process as claimed in claim 1 and additionally comprising:
   supplying said air in a stoichiometric excess of the amount required to react with said mercury vapor; and
   recovering a gaseous product from said oxidation zone, said gaseous product being substantially a mixture of nitrogen and oxygen.

5. The process as claimed in claim 1, wherein said oxidation zone is maintained at about 460° C. and 5 atmospheres pressure, and said decomposition zone is maintained at about 400° C. and sub-atmospheric pressure.

6. The process as claimed in claim 1, and further comprising preheating said air prior to reaction within said oxidation zone.

7. The process as claimed in claim 1 wherein the decomposition zone is at a pressure of at least atmospheric pressure and the temperature therein is greater than 500° C.

References Cited

FOREIGN PATENTS 628,572  8/1949  Great Britain.

OTHER REFERENCES

Mellor: Comprehensive Treatise on Inorganic and Theoretical Chemistry, vol. 4, 1923, pp. 771–775, QD31M4, Group 110.

OSCAR R. VERTIZ, *Primary Examiner.*

H. S. MILLER, *Assistant Examiner.*